United States Patent
Berestov (10) Patent No.: US 7,567,271 B2
(45) Date of Patent: Jul. 28, 2009

(54) SHARED COLOR SENSORS FOR HIGH-RESOLUTION 3-D CAMERA

(75) Inventor: Alexander Berestov, San Jose, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 32 days.

(21) Appl. No.: 11/644,769

(22) Filed: Dec. 21, 2006

(65) Prior Publication Data

US 2007/0159640 A1 Jul. 12, 2007

Related U.S. Application Data

(60) Provisional application No. 60/757,336, filed on Jan. 9, 2006.

(51) Int. Cl.
*H04N 13/02* (2006.01)

(52) U.S. Cl. .............................. 348/48; 348/47; 348/46; 348/42; 348/272; 348/280; 348/273; 348/294; 382/260

(58) Field of Classification Search .................... 348/48, 348/47, 42, 272, 280, 294, 298, 308, 273, 348/46; 382/260
See application file for complete search history.

(56) References Cited

U.S. PATENT DOCUMENTS

| 4,942,103 | A | | 7/1990 | Reithel et al. | |
|---|---|---|---|---|---|
| 5,003,385 | A | * | 3/1991 | Sudo | 348/49 |
| 5,023,723 | A | * | 6/1991 | Date et al. | 348/337 |
| 5,251,024 | A | | 10/1993 | Furukawa et al. | |
| 5,418,564 | A | * | 5/1995 | Aoki et al. | 348/264 |
| 5,907,434 | A | * | 5/1999 | Sekine et al. | 359/462 |
| 6,028,672 | A | | 2/2000 | Geng | |
| 6,546,208 | B1 | * | 4/2003 | Costales | 396/324 |
| 6,614,478 | B1 | | 9/2003 | Mead | |
| 6,788,338 | B1 | | 9/2004 | Dinev et al. | |
| 6,791,598 | B1 | * | 9/2004 | Luken et al. | 348/36 |
| 6,930,807 | B1 | | 8/2005 | Shimomura et al. | |
| 6,998,660 | B2 | | 2/2006 | Lyon et al. | |
| 2003/0007089 | A1 | * | 1/2003 | Rosiene et al. | 348/384.1 |

OTHER PUBLICATIONS

Electronic Imaging Conference 2005: Recovery of a missing color component in stereo images (S. Ince, J. Konrad, Boston University) Acquired at http://iss.bu.edu/jkonrad/Publications/local/cpapers/Ince05sdvrs.pdf, 12 pages.

* cited by examiner

*Primary Examiner*—Shawn An
(74) *Attorney, Agent, or Firm*—Michael C. Stephens, Jr.; Trellis IP Law Group, PC (57) ABSTRACT

In one embodiment, an apparatus for three-dimensional (3-D) image acquisition can include: (i) first and second lenses configured to receive light from a scene; (ii) first, second, third, and fourth sensors; (iii) a first beam splitter arranged proximate to the first lens, where the first beam splitter can provide a first split beam to the first sensor, and a second split beam to the second sensor; and (iv) a second beam splitter arranged proximate to the second lens, where the second beam splitter can provide a third split beam to the third sensor, and a fourth and split beam to the fourth sensor. For example, the sensors can include charge-coupled devices (CCDs) or CMOS sensors.

9 Claims, 6 Drawing Sheets

SHARED COLOR SENSORS FOR HIGH-RESOLUTION 3-D CAMERA

CROSS REFERENCES TO RELATED APPLICATIONS

This invention claims priority from U.S. Provisional Patent Application Ser. No. 60/757,336, entitled SHARED COLOR SENSORS FOR HIGH-RESOLUTION 3D CAMERA, filed on Jan. 9, 2006, which is hereby incorporated by reference as if set forth in full in this application for all purposes.

BACKGROUND

Sony has introduced the world's first HDV 1080i camcorder. The HDR-FX1 Handycam® camcorder records and plays back high-definition video with 1080 interlaced lines of resolution, which may be the highest resolution (1440 pixels× 1080 lines) of any consumer camcorder available. This high-resolution was achieved by using a three chip advanced HAD™ structure and a charge-coupled device (CCD) system in dichroic prism to separate color information. Colors from this video camera may be extremely accurate, and color artifacts can be greatly reduced relative to other approaches.

Three-dimensional (3-D) technology has been a century in development, yet has never really established itself in the mainstream. However, the emergence of liquid crystal display (LCD) and plasma screens, which may be better suited to rendering 3-D images than traditional cathode ray tube (CRT) monitors and televisions (TVs), in both consumer electronics and in the computer world, has fired interest in 3-D technology. Further, many recent movies were shot in 3-D using two high-resolution cameras coupled together.

With sales of high-definition television (HDTV) sets exploding, along with the availability of high-definition (HD) programming, the expectation of having personal content in HD is growing rapidly. With the development of HDTV, more and more HD content will likely be acquired in 3-D. A typical conventional approach for such 3-D acquisition is to use two separate cameras, with one for the left eye view, and another for the right eye view. However, in this approach, cameras should be perfectly aligned and the system price may be more than double the price of a corresponding single camera.

SUMMARY

In one embodiment, an apparatus for three-dimensional (3-D) image acquisition can include: (i) first and second lenses configured to receive light from a scene; (ii) first, second, third, and fourth sensors; (iii) a first beam splitter arranged proximate to the first lens, where the first beam splitter can provide a first split beam to the first sensor, and a second split beam to the second sensor; and (iv) a second beam splitter arranged proximate to the second lens, where the second beam splitter can provide a third split beam to the third sensor, and a fourth and split beam to the fourth sensor. For example, the sensors can include charge-coupled devices (CCDs) or complementary metal oxide semiconductor (CMOS) sensors.

In one embodiment, an apparatus for 3-D image acquisition can include: (i) first and second lenses configured to receive light from a scene; (ii) a first sensor arranged to receive a first beam from the first lens, where the first sensor can acquire first and second colors; and (iii) a second sensor arranged to receive a second beam from the second lens, where the second sensor can acquire the second color, and a third color. For example, the sensors can include direct image sensors (DISs) or sensors having color filter arrays (CFAs), or other color filter configurations.

In one embodiment, a method of acquiring a 3-D image can include: (i) receiving light from a scene in first and second lenses; (ii) using a first beam splitter arranged proximate to the first lens for providing a first split beam to a first sensor, and a second split beam to a second sensor; (iii) using a second beam splitter arranged proximate to the second lens for providing a third split beam to a third sensor, and a fourth split beam to a fourth sensor; and (iv) generating missing color channel images using a reconstruction algorithm.

A further understanding of the nature and the advantages of particular embodiments disclosed herein may be realized by reference of the remaining portions of the specification and attached drawings.

DETAILED DESCRIPTION OF EMBODIMENTS

Figure 1:
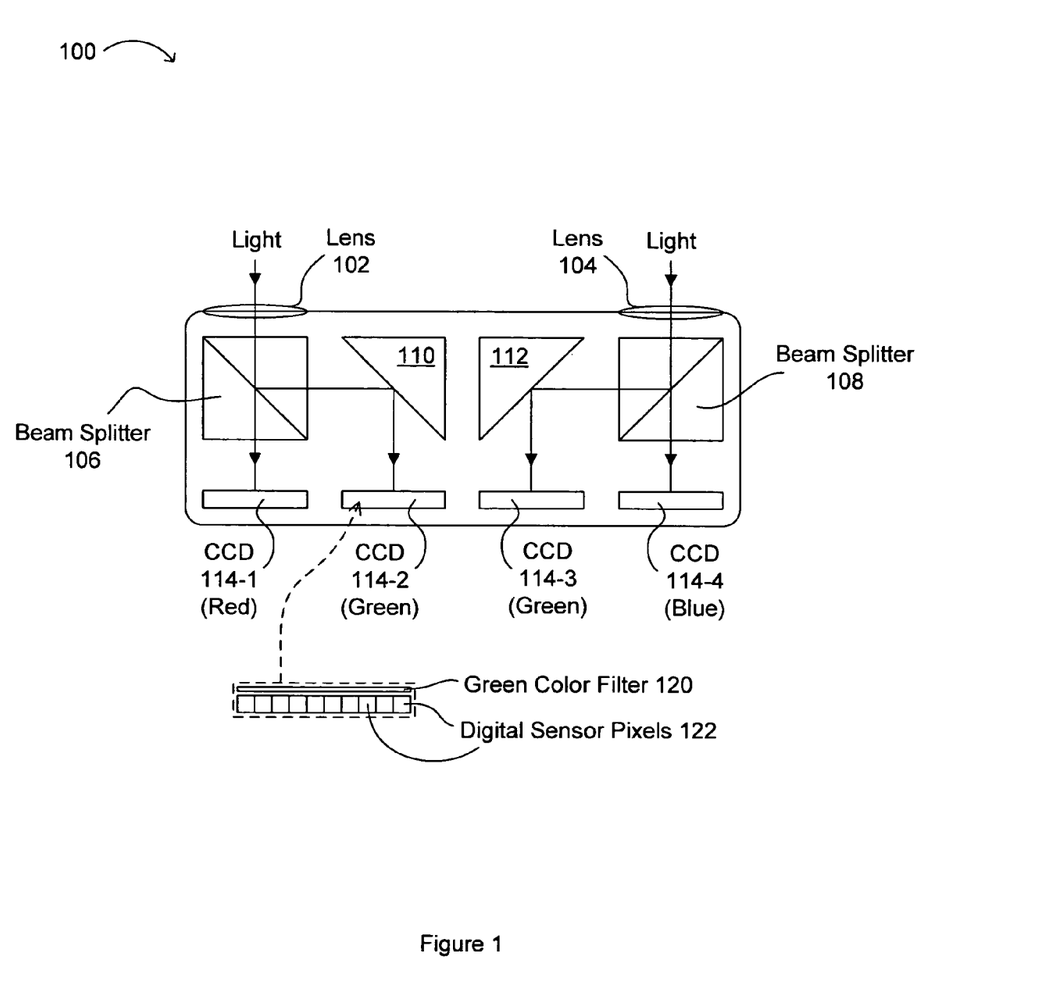
FIG. 1 shows an example four sensor three-dimensional (3-D) camera structure using charge-coupled devices (CCDs) and two mirrors in accordance with embodiments of the present invention.

Referring now to FIG. 1, an example four sensor three-dimensional (3-D) camera structure using charge-coupled devices (CCDs) and two mirrors in accordance with embodiments of the present invention is shown and indicated by the general reference character 100. In particular embodiments, a high-resolution 3-D video camera or digital still camera can utilize only four CCDs instead of six, as may be required in a system having two coupled cameras, as described above. For example, two green channel CCDs, one red channel CCD, and one blue channel CCD can be utilized.

In this particular example camera structure, light from a scene may go through left and right lenses 102 and 104, respectively. Then, light can be split by two beam splitters (e.g., semitransparent mirrors) 106 and 108. Reflected light may be reflected again by mirrors 110 and 112, finally creating two images on the left and right green CCD sensors CCD 114-2 and CCD 114-3, as shown. Further, other types of sensors (e.g., CMOS sensors) can be used in particular embodiments. In any event, light can go through beam splitters 106 and 108 to form a left view image on red sensor CCD 114-1, and a right view image on blue sensor CCD 114-4. Also, as shown for the example CCD 114-2, each sensor can include a plurality of pixels 122, as well as a color filter (e.g., green color filter 120).

In the arrangement as shown, a stereo pair for the green channel, and only a left eye image for the red channel, and a right eye image for the blue channel can be created. Missing images (e.g., right eye for red, and left eye for blue) can be constructed by matching the images for the green channel. In such matching as part of a reconstruction algorithm, a given point in a first image has its corresponding point in the second image, which may be constrained to lie on a line called the epipolar line of the first point, so every point in both images has an epipolar line. As soon as one knows the correspondence between points in two images, it is possible to recover the disparity field, which is the displacement of corresponding points along the epipolar lines. Thus, if two cameras are in parallel, the disparity is inversely proportional to the distance from the object to the base line. The general relation may be as shown below in Equation 1:

$$D = fb/Z \qquad (1)$$

Here, "D" may be the disparity, "f" the focal length of the cameras (it is the same for both parallel cameras), "b" the distance between cameras (the base), and "Z" the distance from the object to the baseline. Here, the disparity approaches zero when depth approaches infinity.

Figure 2:
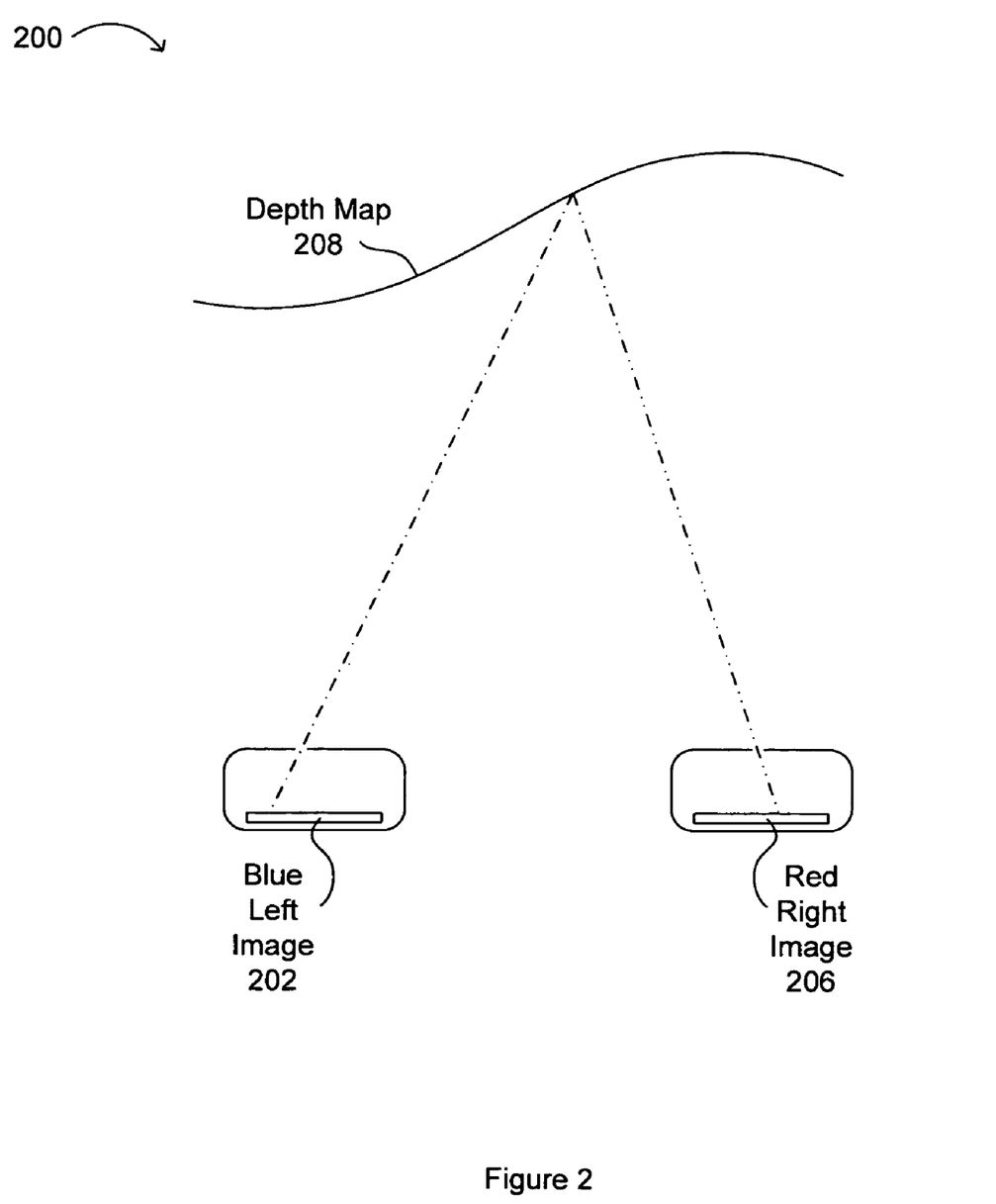
FIG. 2 shows an example depth map for calculating missing images in accordance with embodiments of the present invention.

Referring now to FIG. 2, an example depth map for calculating missing images in accordance with embodiments of the present invention is shown and indicated by the general reference character 200. In this example, depth map 208 can be utilized for calculating missing left (e.g., blue left image 202) and right images (e.g., red right image 206). For example, a red pixel may be reconstructed from a blue pixel, and vice versa. Such a depth map may define a distance from the camera to every point in the scene, and can be used to reconstruct missing images, as discussed above. In this fashion, images for all six color channels, as are conventionally required to reproduce a color scene in three dimensions, can be accomplished by using only four sensors.

In particular embodiments, a processor can be included in a 3-D video camera in order to provide a matching and/or reconstruction algorithm using a depth map, as shown above. For example, a digital signal processor (DSP), another specialized type of processor, or a general-purpose processor can be used to implement the reconstruction algorithm. In any event, a reconstruction algorithm can provide a matching for every pixel from a left image correlated to one in a right image, or vice versa. Further, such a depth map may be stored (e.g., in memory hardware within a camera and/or in removable memory hardware) for still images, and/or on a per-frame basis for video images.

Figure 3:
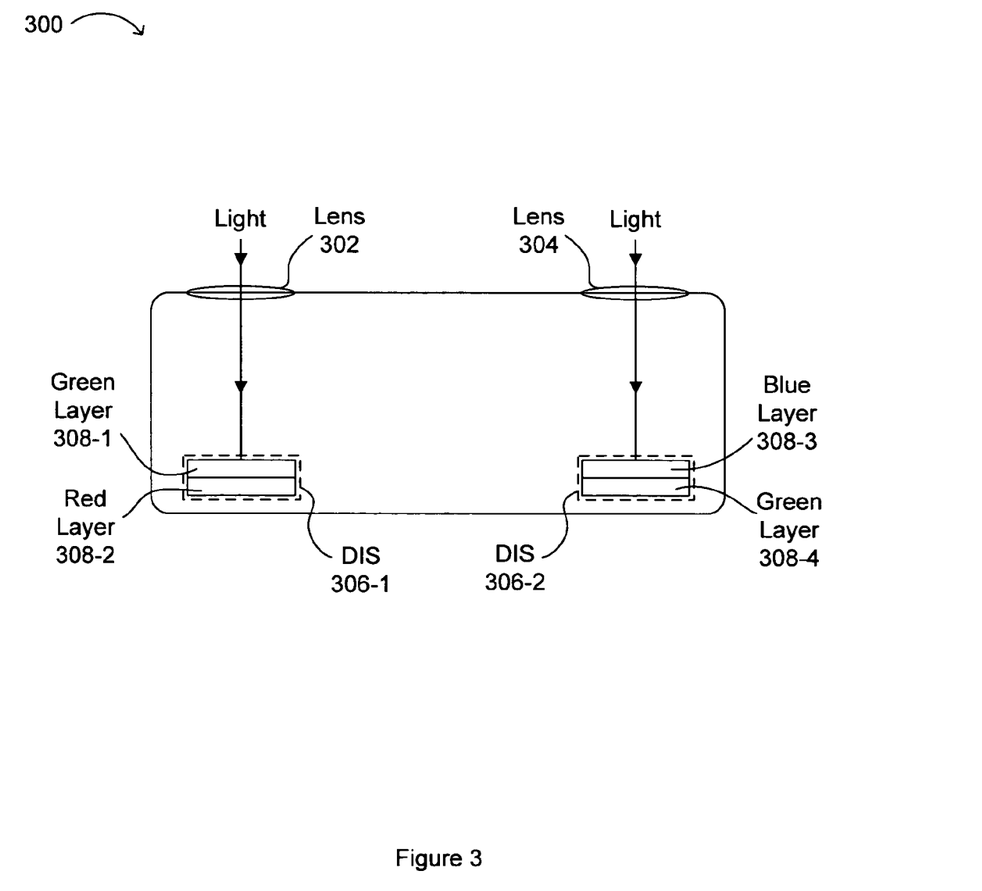
FIG. 3 shows an example two direct image sensor (DIS) 3-D camera structure in accordance with embodiments of the present invention.

Referring now to FIG. 3, an example two direct image sensor (DIS) 3-D camera structure in accordance with embodiments of the present invention is shown and indicated by the general reference character 300. A conventional direct image sensor may be an image sensor that directly captures red, green, and blue light at each point in an image during a single exposure. One of the problems with conventional direct image sensors is that the deeper the layer of the light sensing, the greater are the distortions introduced by the upper layers, making it more difficult to recover correct information from the deeper layers of the direct image sensor.

In particular embodiments, only two layers may be required in each direct image sensor (e.g., DIS 306-1, DIS 306-2) to recover a 3-D color picture of a scene. In the example of FIG. 3, having two layers instead of three layers may dramatically improve the performance of single solid-state sensors. In this example camera, light from the scene may pass directly to DIS sensors, thus forming a stereo pair for the green channel image, and only one image per red and blue channel. Light can pass via lens 302 to DIS 306-1, which can include green layer 308-1 and red layer 308-2. Light from a scene can also pass via lens 304 to DIS 306-2, which can include blue layer 308-3 and green layer 308-4, for example.

Image reconstruction may be performed in a manner as discussed above with reference to FIGS. 1 and 2. Further, any color channel for acquiring a stereo pair and for depth map recovery can be utilized. In particular embodiments, green may be preferable for the stereo pair because high frequency information is contained in the green channel, so depth map recovery may be more precise for the green light. Moreover, the human brain can tolerate inaccuracies in blue and red much better than those in green, so artifacts from image reconstruction may be less visible in red and blue channels.

Figure 4:
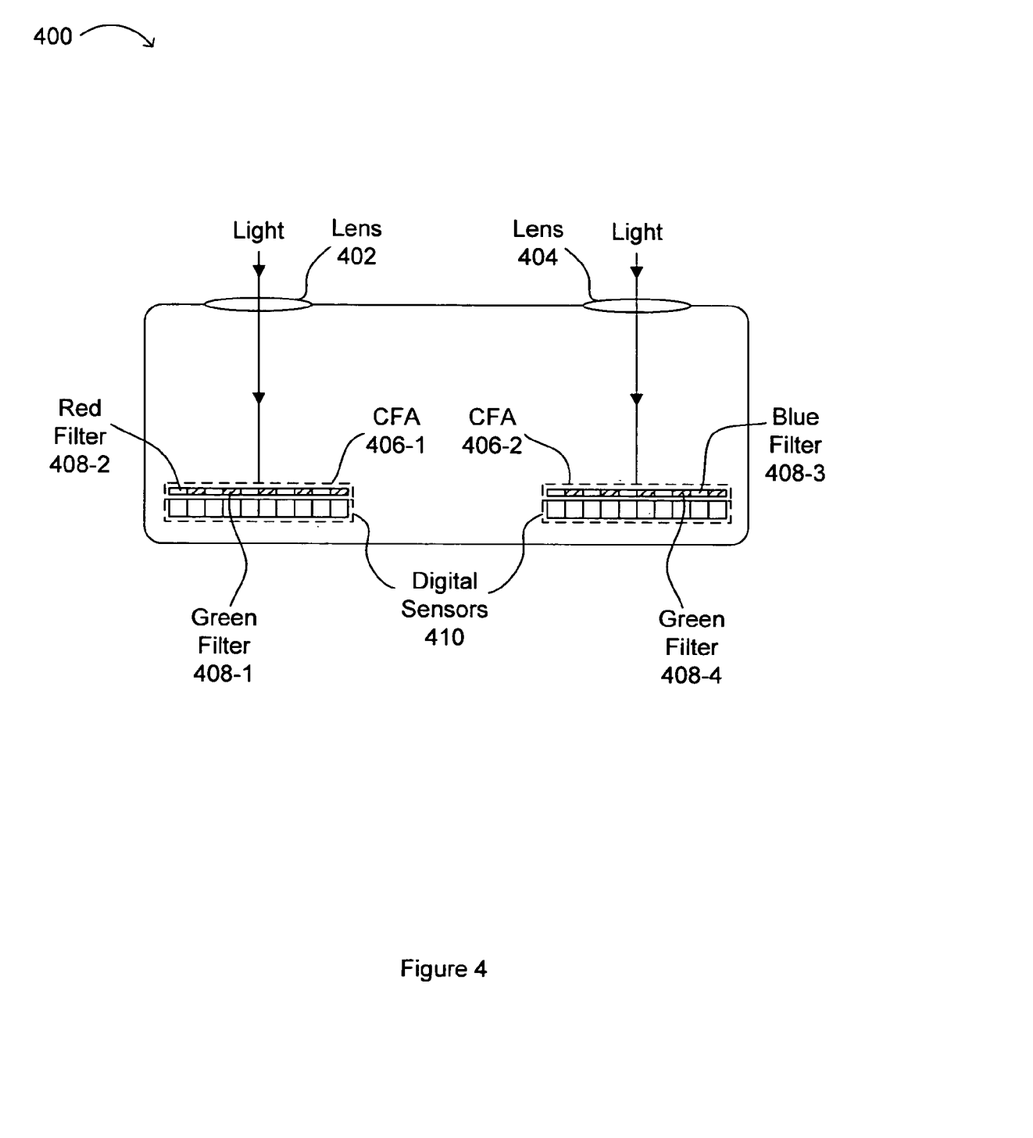
FIG. 4 shows an example two digital sensor with color filter array (CFA) 3-D camera structure in accordance with embodiments of the present invention.

Referring now to FIG. 4, an example two digital sensor with color filter array (CFA) 3-D camera structure in accordance with embodiments of the present invention is shown and indicated by the general reference character 400. Each of digital sensors 410 in this particular example may include color filter arrays with only two color filters. For example, CFA 406-1 can include green filter 408-1 and red filter 408-2, while CFA 406-2 can include blue filter 408-3 and green filter 408-4.

In this particular example camera, light from the scene may pass via lenses 402 and 404 to digital sensors 410 (e.g., via CFAs 406-1 and 406-2), thus forming a stereo pair for the green channel image (e.g., via green filters 408-1 and 408-4), and only one image per red (e.g., via red filter 408-2) and blue (e.g., via blue filter 408-3) channels. In addition, image reconstruction for missing color channels can be performed in a similar way as discussed above.

Figure 5:
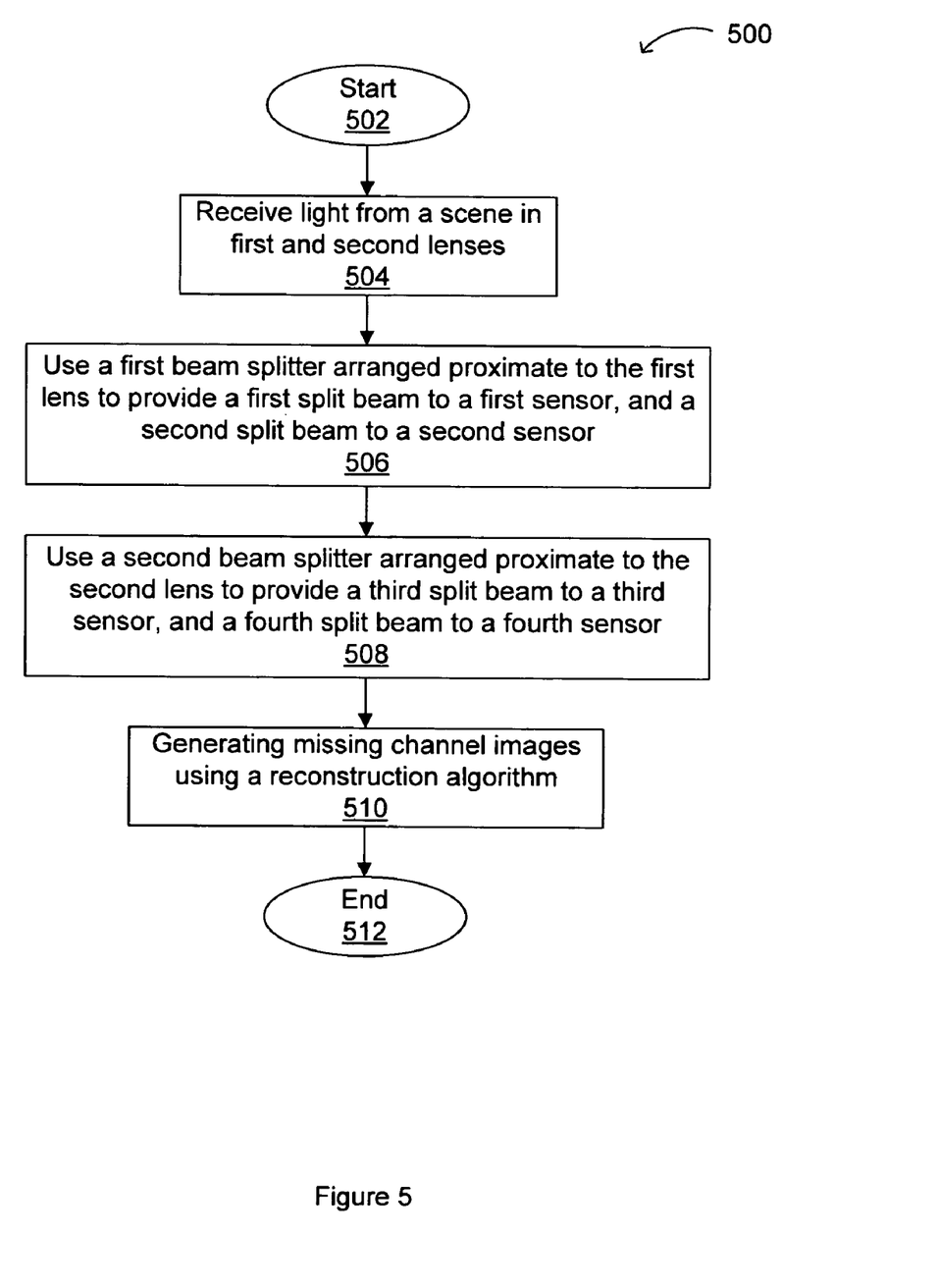
FIG. 5 shows an example flow diagram of a method of acquiring a 3-D color image in accordance with embodiments of the present invention.

Referring now to FIG. 5, an example flow diagram of a method of acquiring a 3-D color image in accordance with embodiments of the present invention is shown and indicated by the general reference character 500. The flow can begin (502), and light can be received from a scene in first and second lenses (504). Using a first beam splitter arranged proximate to the first lens, a first split beam can be provided to a first sensor, and a second split beam can be provided to a second sensor (506). Similarly, using a second beam splitter arranged proximate to the second lens, a third split beam can be provided to a third sensor, and a fourth split beam can be provided to a fourth sensor (508). Also, missing channel images can be generated using a reconstruction algorithm (510), and the flow can complete (512).

Figure 6:
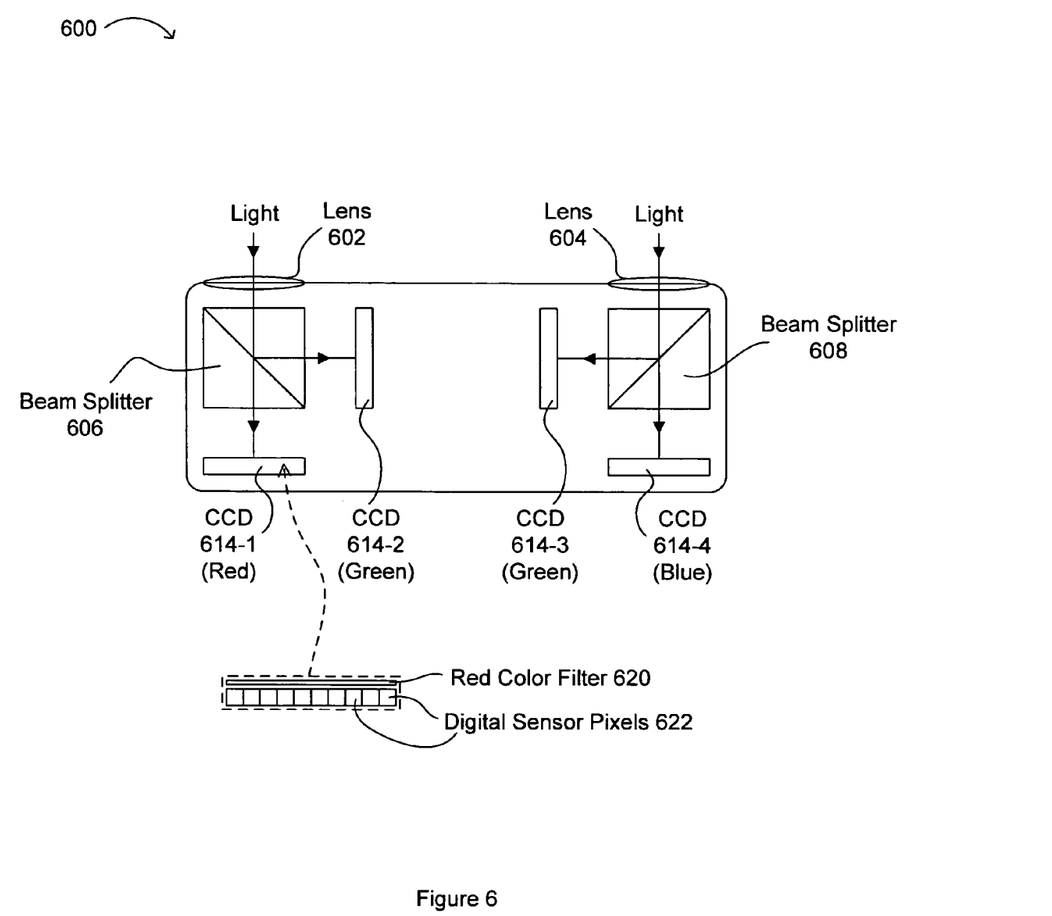
FIG. 6 shows an example four sensor 3-D camera structure using CCDs without mirrors in accordance with embodiments of the present invention.

Referring now to FIG. 6, an example four sensor 3-D camera structure using CCDs without mirrors in accordance with embodiments of the present invention is shown and indicated by the general reference character 600. In this particular example camera structure, light from a scene may go through left and right lenses 602 and 604, respectively. Then, light can be split by two beam splitters (e.g., semitransparent mirrors) 606 and 608. One split beam from beam splitter 606 can reach red sensor 614-1, while another split beam can reach green sensor 614-2. Similarly, one split beam from beam splitter 608 can reach blue sensor 614-4, while another can reach green sensor 614-3. Further, other types of sensors (e.g., CMOS sensors) can be used in particular embodiments. Also, as shown for the example CCD 614-1, each sensor can include a plurality of individual pixels 622, as well as a color filter (e.g., red color filter 620).

Although the description has been described with respect to particular embodiments thereof, these particular embodiments are merely illustrative, and not restrictive. For example, other types of sensors (e.g., CMOS sensors), as well as other arrangements of such sensors, can be utilized in accordance with embodiments. Also, other color filters and/or layers can be used to form a stereo pair or a single color in a particular image. In addition, other types of hardware devices, image acquisition devices, or cameras can be included in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. An apparatus for three-dimensional image acquisition, the apparatus comprising:
   first and second lenses configured to receive light from a scene, wherein the first and second lenses are in alignment with each other along diameters thereof;
   a first sensor coupled to a red color filter such that the first sensor is configured to acquire only a red color from the received light, wherein the first sensor is in alignment with an axis of the first lens and the first sensor is parallel to a diameter of the first lens;
   a second sensor coupled to a first green color filter such that the second sensor is configured to acquire only a green color from the received light, wherein the second sensor is parallel to the diameter of the first lens and the second sensor is in alignment with the first sensor;
   a first beam splitter arranged proximate to the first lens and in alignment with the axis of the first lens, wherein the first beam splitter is configured to receive light directly from the first lens, and to provide therefrom, a first split beam to the first sensor, and a second split beam to a first mirror, the first and second split beams traveling on independent paths, the first mirror being configured to receive the second split beam from the first beam splitter, and to provide therefrom a first reflected beam to the second sensor;
   a third sensor coupled to a second green color filter such that the third sensor is configured to acquire only a green color from the received light, wherein the third sensor is parallel to a diameter of the second lens and the third sensor is in alignment with the second sensor;
   a fourth sensor coupled to a blue color filter such that the fourth sensor is configured to acquire only a blue color from the received light, wherein the fourth sensor is in alignment with an axis of the second lens and the fourth sensor is parallel to the diameter of the second lens, the fourth sensor being in alignment with the third sensor; and
   a second beam splitter arranged proximate to the second lens and in alignment with the axis of the second lens, wherein the second beam splitter is configured to receive light directly from the second lens, and to provide therefrom, a third split beam to a second mirror, and a fourth split beam to the fourth sensor, the third and fourth split beams traveling on independent paths, the second mirror being configured to receive the third split beam from the second beam splitter, and to provide therefrom a second reflected beam to the third sensor.

2. The apparatus of claim 1, wherein each of the first, second, third, and fourth sensors comprises a charge-coupled device (CCD).

3. The apparatus of claim 1, wherein each of the first, second, third, and fourth sensors comprises a complementary metal oxide semiconductor (CMOS) sensor.

4. The apparatus of claim 1, further comprising a processor configured to perform a reconstruction algorithm, the processor being configured for a video camera.

5. The apparatus of claim 4, wherein a missing blue channel image for the first sensor and a missing red channel image for the fourth sensor are provided by the reconstruction algorithm.

6. A method of acquiring a three-dimensional image, the method comprising:
   receiving light from a scene in first and second lenses, wherein the first and second lenses are in alignment with each other along diameters thereof;
   using a first beam splitter arranged proximate to and in alignment with an axis of the first lens for providing a first split beam to a first sensor, and a second split beam to a second sensor, the second split beam being reflected using a first mirror prior to reaching the second sensor, wherein the first sensor is in alignment with the axis of the first lens and the first sensor is parallel to a diameter of the first lens, the first and second split beams traveling on independent paths;
   using a second beam splitter arranged proximate to and in alignment with an axis of the second lens for providing a third split beam to a third sensor, and a fourth split beam to a fourth sensor, the third split beam being reflected using a second mirror prior to reaching the third sensor, wherein the fourth sensor is in alignment with the axis of the second lens and the fourth sensor is parallel to a diameter of the second lens, the third and fourth split beams traveling on independent paths;
   deriving only a red color from the received light for the first sensor using a red color filter coupled to the first sensor;
   deriving only a green color from the received light for each of the second and third sensors using a first green color filter coupled to the second sensor and a second green color filter coupled to the third sensor;
   deriving only a blue color from the received light for the fourth sensor using a blue color filter coupled to the fourth sensor; and
   generating missing channel images using a reconstruction algorithm to provide the three-dimensional image.

7. The method of claim 6, wherein each of the first, second, third, and fourth sensors comprises a charge-coupled device (CCD).

8. The method of claim 6, wherein each of the first, second, third, and fourth sensors comprises a complementary metal oxide semiconductor (CMOS) sensor.

9. The method of claim 6, wherein the generating the missing channel images comprises using a depth map for generating a missing blue channel image for the first sensor and a missing red channel image for the fourth sensor.

* * * * *